United States Patent
Brownlee

(10) Patent No.: US 6,191,694 B1
(45) Date of Patent: *Feb. 20, 2001

(54) OXYGEN ENRICHMENT SYSTEM FOR VEHICLES

(76) Inventor: David W. Brownlee, 826 Eleventh St., Oakmont, PA (US) 15139

( * ) Notice: Under 35 U.S.C. 154(b), the term of this patent shall be extended for 0 days.

This patent is subject to a terminal disclaimer.

(21) Appl. No.: 09/491,891

(22) Filed: Jan. 27, 2000

Related U.S. Application Data

(63) Continuation-in-part of application No. 09/300,859, filed on Apr. 28, 1999, now Pat. No. 6,034,606, which is a continuation-in-part of application No. 09/135,927, filed on Aug. 18, 1998, now Pat. No. 5,910,773.

(51) Int. Cl.[7] .................................................. G08B 23/00
(52) U.S. Cl. ............................................ 340/576; 180/272
(58) Field of Search ..................................... 340/575, 576; 180/272; 128/201.21, 205.24; 204/230; 205/349

(56) References Cited

U.S. PATENT DOCUMENTS

| | | |
|---|---|---|
| 3,875,957 | 4/1975 | Veit et al. . |
| 4,036,253 | 7/1977 | Fegan et al. . |
| 4,725,824 | 2/1988 | Yoshioka . |
| 4,728,939 | 3/1988 | Otani . |
| 4,848,333 | 7/1989 | Waite . |
| 4,928,090 | 5/1990 | Yoshimi et al. . |
| 4,953,111 | 8/1990 | Yamamoto et al. . |
| 5,036,852 | 8/1991 | Leishman . |
| 5,037,518 | 8/1991 | Young et al. . |
| 5,372,129 | 12/1994 | Ryder . |
| 5,589,052 | 12/1996 | Shimamune et al. . |
| 5,690,797 | 11/1997 | Harada et al. . |
| 5,706,801 | 1/1998 | Remes et al. . |
| 5,709,732 | 1/1998 | Prasad . |
| 5,729,619 | 3/1998 | Puma . |
| 5,910,773 | * 6/1999 | Brownlee .............................. 340/576 |
| 6,034,606 | * 6/1999 | Brownlee .............................. 340/576 |

OTHER PUBLICATIONS

"Compact Membrane Could Make 4–cyl. Engines Act Like V–6s, or Reduce Emissions and Enable Lean–burn", DuPont Automative–Announcement and Press Releases, Feb. 1997.
"Compact Membrane Technology Could Boost Engine Power, Slash Emissions", DuPont Automotive—Case Study, Jun. 1997.

* cited by examiner

*Primary Examiner*—Nina Tong
(74) *Attorney, Agent, or Firm*—David W. Brownlee; Eckert Seamans Cherin & Mellott, LLC

(57) ABSTRACT

This invention provides oxygen-enriched air to the passenger compartment of wheeled vehicles to reduce drowsiness of drivers of wheeled vehicles so as to reduce the number of accidents caused by drowsy drivers. The invention also makes drivers and passengers in wheeled vehicles more alert and feel better by increasing the percentage of oxygen in the passenger compartments of wheeled vehicles to a beneficial and safe level.

15 Claims, 3 Drawing Sheets

OXYGEN ENRICHMENT SYSTEM FOR VEHICLES

CROSS-REFERENCE TO RELATED APPLICATION

This is a continuation-in-part of application Ser. No. 09/300,859, filed Apr. 28, 1999, now issued as U.S. Pat. No. 6,034,606 which is a continuation-in-part of application Ser. No. 09/135,927, filed Aug. 18, 1998, and entitled "Oxygen Supply System for Wheeled Vehicles", now issued as U.S. Pat. No. 5,910,773.

BACKGROUND OF THE INVENTION

1. Field of the Invention

This invention relates to wheeled vehicles such as cars, trucks, tractors and buses and in particular to a system for supplying oxygen-enriched air to the passenger compartments in such vehicles. The system may alternatively generate oxygen from water using electricity from the vehicle's alternator or generator, use oxygen from an oxygen storage tank(s), or use oxygen enriched air which is produced by membrane filtration. The system may include a regulator for regulating the oxygen or oxygen-enriched air that is fed to the passenger compartment to maintain the oxygen content of the air in the compartment within an optimum range.

2. Description of the Prior Art

Many vehicular accidents are caused every year by drivers falling asleep at the wheel of their vehicles. Long hours at the wheel, the monotony of driving, and other factors result in drowsiness and accidents or near misses. Some experts have opined that more vehicular accidents are caused by sleepy drivers than by drunken drivers.

Drivers attempt to stay awake by drinking coffee, taking caffeine pills, opening the car windows, and playing the car radio loudly, among other things. Laws have been enacted that limit the hours that truckers and bus drivers can drive so as to minimize accidents caused by drowsiness. Numerous inventions have also been made for detecting drowsiness in a driver and setting off an alarm to rouse the driver. See, for example, U.S. Pat. Nos. 4,725,824; 4,728,939; 4,953,111; and 5,729,619. However, none of these things has been effective to significantly reduce the number of accidents caused by sleepy drivers.

Accordingly, an improved system is needed for reducing drowsiness of drivers and reducing accidents caused by sleepy drivers.

SUMMARY OF THE INVENTION

The present invention increases alertness of drivers of wheeled vehicles so as to reduce the number of accidents caused by drowsy drivers. The invention also makes drivers and passengers in wheeled vehicles more alert and feel better by improving the percentage of oxygen in the passenger compartments of wheeled vehicles.

The oxygen content of air that people breathe is generally about 21 percent by volume (about 23% by weight) depending on location and ambient conditions. The oxygen content of most ambient air has decreased slightly during the last couple of centuries. This may be a result of reductions in plant life and/or increases in the use of fossil fuels, among other factors. The oxygen content in some places such as office buildings, buses, cars and other closed or partially closed compartments is usually less than the oxygen content of outside air.

This invention may include an electrolyzing system for evolving gaseous oxygen from water and feeding the oxygen into the passenger compartment of a wheeled vehicle, may use oxygen from a storage tank or tanks carried by the vehicle, or may include a membrane system to produce oxygen-enriched air which is fed into the passenger compartment. The invention detects the oxygen content of the air in the passenger compartment and controls the oxygen supply to regulate the oxygen flow into the compartment. The system can be set to flow oxygen-enriched air into the compartment if the percent of oxygen-enriched air in the compartment falls to or below a preselected value and shut off the supply of oxygen when the oxygen content rises to a preselected value. The system may include a diluter to reduce the concentration of the oxygen that is supplied into the passenger compartment. As used herein, the phrase "wheeled vehicle" is used to mean a vehicle that operates mainly on land and has wheels on it for supporting and propelling the vehicle.

The optimum percent of oxygen in the passenger compartment for reduced drowsiness and increased alertness need be only a few percent above the percent of oxygen in ambient air. It is believed that raising the percent oxygen to a range of about 23–25% by volume can substantially increase the alertness of people breathing the air. It is desirable to keep the oxygen content in the passenger compartment from exceeding approximately 25% by volume to avoid a possible risk of fire hazard in the compartment.

This invention provides a convenient and inexpensive system for providing a small increase in the oxygen content of air in passenger compartments. The invention provides a system that helps drivers and passengers remain alert and maintain well-being. This invention reduces drowsiness of drivers and reduces accidents caused by drowsiness.

The above and other objects and advantages of this invention will be more fully understood and appreciated by reference to the following description and the drawings which form a part hereof.

DESCRIPTION OF A PREFERRED EMBODIMENT

Figure 1:
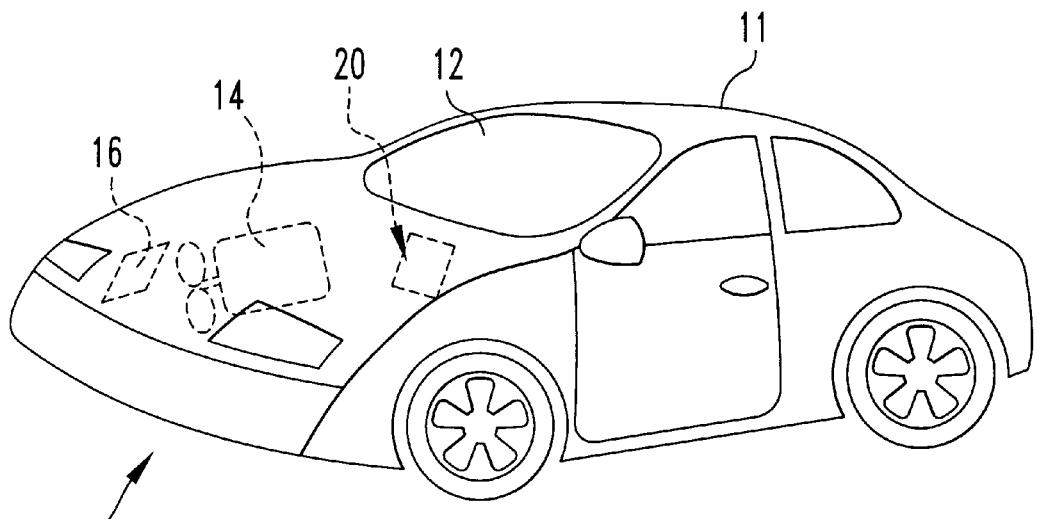
FIG. 1 is a schematic representation of a wheeled vehicle having a system for providing oxygen to passenger compartments in accordance with this invention.

FIG. 1 depicts an automobile 10, as a typical wheeled vehicle, which is suitable for use of the present invention. Other wheeled vehicles having driver/passenger compartments that can benefit from this invention includes trucks, buses, tractors, and rail cars such as trains and subway vehicles. The car 10 has a body 11 with a passenger compartment 12, an internal combustion engine or motor 14 and an electricity generating system 16. The electricity generating system 16 may be a conventional generator, an alternator or other like devices which are driven by the internal combustion engine 14 and produce electricity for a variety of uses such as lights, radio, starter, horn, etc., not shown. A wheeled vehicle utilizing this invention could alternatively be powered by an electric motor or by a hybrid drive system that includes both an electric motor and an internal combustion engine instead of solely by an internal combustion engine.

In accordance with this invention the car 10 or other wheeled vehicle preferably has a system 20 for producing and supplying oxygen-enriched air supply to the passenger compartment 12. The system 20 can be located in the car 10 at a variety of locations such as the fire wall of the engine compartment, as shown in FIG. 1, or other locations in the engine compartment, passenger compartment 12 or trunk.

Figure 2:
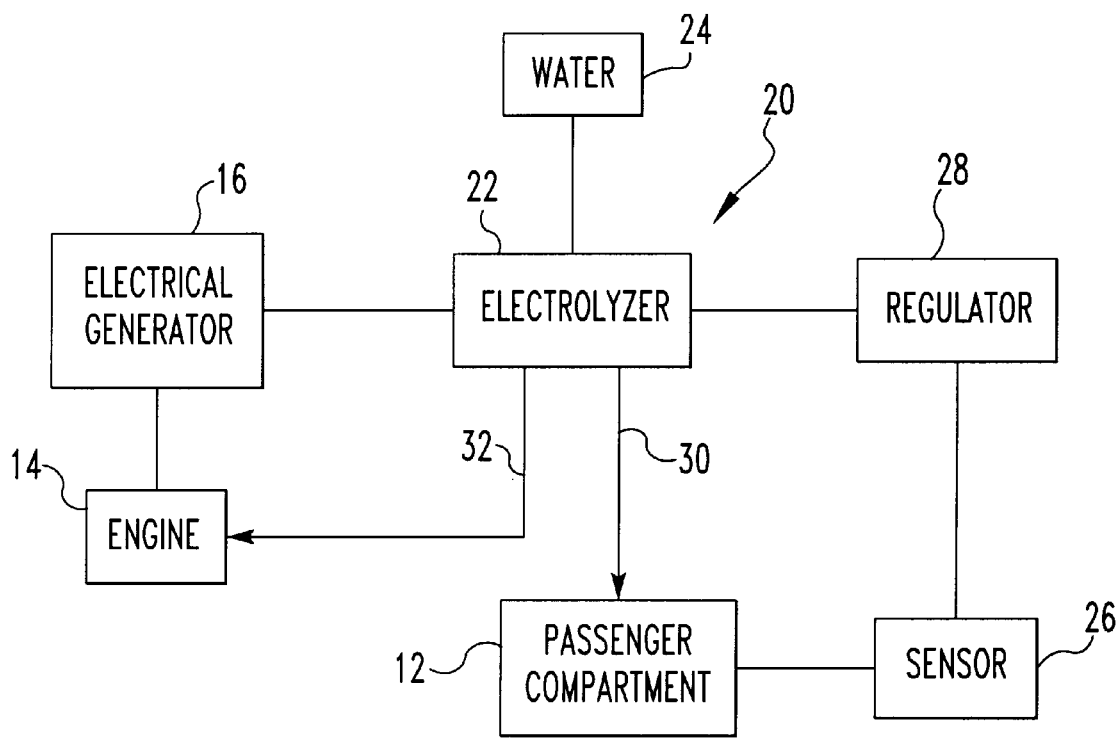
FIG. 2 is a flow diagram of an oxygen supply system for a wheeled vehicle in accordance with this invention.

As shown in FIG. 2, the oxygen generating system 20 preferably comprises an electrolyzing unit 22, a container 24 for water, a sensor 26 and a regulator 28. The system preferably uses deionized or distilled water to avoid or minimize build-up of scale and debris in the electrolyzer 22. Electrolyzing devices are well known in the art as is disclosed in U.S. Pat. Nos. 5,037,518; 5,589,052; and 5,690,797, the disclosures of which are incorporated herein by reference. Such electrolyzing systems can generate high purity gases under pressure in a safe manner without need for gas compressors. Apparatus for generating gaseous oxygen are available from companies such as Packard Instrument Company of Downers Grove, Ill.

The electrolyzer 22 produces gaseous hydrogen, as well as oxygen. The hydrogen gas may be used as a supplement fuel for the internal combustion engine, or can alternatively be exhausted to the atmosphere. The hydrogen gas is produced in relatively small quantities, and can be safely and easily dispersed into the ambient air. However, use of hydrogen as a fuel supplement for the engine may be desirable to make the system more cost effective.

The system further has a pipe 30 or other conduit device for flow of oxygen to the passenger compartment and a pipe 32 for flow of hydrogen to the engine or to an outside vent. The generation of oxygen and hydrogen by the electrolyzer 22 can produce sufficient gas pressure to move the gases through the pipes without need for a compressor, fan or other such device, but such flow-enhancing devices are not excluded from use in this invention.

It is important that the system 20 include an oxygen sensor 26 or other measuring device for sensing and measuring the oxygen content in the air in the passenger compartment 12. Oxygen sensors are well known in the art as disclosed by U.S. Pat. Nos. 5,036,852 and 5,706,801, the disclosures of which are incorporated herein by reference. Oxygen concentration sensors are available from Douglas Scientific of Kansas City, Kans., among other companies.

The system further includes a regulator 28 for regulating or controlling the flow of oxygen from the electrolyzer 22 through pipe 30 into the passenger compartment 12. The regulator 28 receives the measurement from sensor 26 and operates much like a thermostat to regulate oxygen flow. The regulator starts the flow of oxygen when the percent oxygen concentration in the passenger compartment 12 falls to or below a preselected percent, such as 22–23% by volume, and stops the flow when the concentration rises to a preselected percent such as 24 or 25% by volume.

For safety reasons, it is critical that the second preselected oxygen content for shutting the electrolyzer off be at a safe level which does not create a risk of rapid combustion of lighted objects such as cigarettes or other combustibles that might be intentionally or accidentally ignited in the passenger compartment. However, significant increases in driver alertness and reductions in drowsiness should result from small increases (such as 2–4% increases) in the oxygen content in the passenger compartment. Such small increases are safely below an oxygen level of about 25% by volume that might be hazardous.

The regulator 28 can optionally regulate the flow of oxygen-enriched air to the passenger compartment 12 either by switching the electrolyzer 22 on and off or by operating a valve, not shown, which controls the oxygen-enriched air flow into the passenger compartment. Computer controlled regulators for such purposes are well known in the art.

The system also preferably includes an oxygen dilution device, not shown, for diluting the concentration of the oxygen in the air that is fed into the passenger compartment through conduit 30. Diluter devices are well known in the art as, for example, are disclosed by U.S. Pat. Nos. 3,875,957; 4,036,253; 4,848,333; and 5,372,129, the disclosures of which are incorporated by reference. The dilution device reduces the concentration of oxygen from approximately 100%, as it comes from the electrolyzer 22, down to approximately 28–35% oxygen, so it can be safety fed into the passenger compartment 12. The diluter can use outside (fresh) air or recirculated air from the passenger compartment for mixing with the oxygen to dilute it. Dilution of the oxygen is desirable to reduce the possibility that highly concentrated oxygen could be a fire hazard if it contacts oil, lipstick or other combustibles in the passenger compartment. It may also be desirable that the outlet for feeding oxygen-enriched air into the passenger compartment be located such that the enriched air will not contact combustibles until the air is further diluted by air in the passenger compartment. Such location could, for example, be within an air duct in the vehicle's heater/air conditioning system.

Dilution of a gas stream containing 100% oxygen down to an oxygen-enriched air stream containing about 28–35% oxygen means that the 100% oxygen is diluted with about 5–18 volumes of air depending on the oxygen content of the feed air and the desired oxygen content of the enriched air. If the feed air is outside air, it will have an oxygen content of about 20% by volume, whereas recirculated air from the passenger compartment might have up to about 24% oxygen content.

It may be desirable for the system to be limited to two settings for the dilution ratios, one when the oxygen is diluted by fresh air and the other when the oxygen is diluted by recirculated air so that the oxygen content of the enriched air never exceeds a relatively low level such as about 25–35% oxygen. Alternatively, the system may employ an oxygen sensor that detects the percent oxygen in the enriched air and a regulator to control the amount of dilution to a predetermined safe percent. This offers the further advantage of increased effectiveness while minimizing risks of fire hazard. The dilution level could be maintained at a level which would safely and quickly raise the oxygen content in the passenger compartment without need for excessive air flow. If the enriched air has a low oxygen content, such as about 25–28%, then higher air flow would be required to raise the oxygen content of the air in the passenger compartment to a desired level of about 24–25% within a reasonable period of time.

Figure 3:
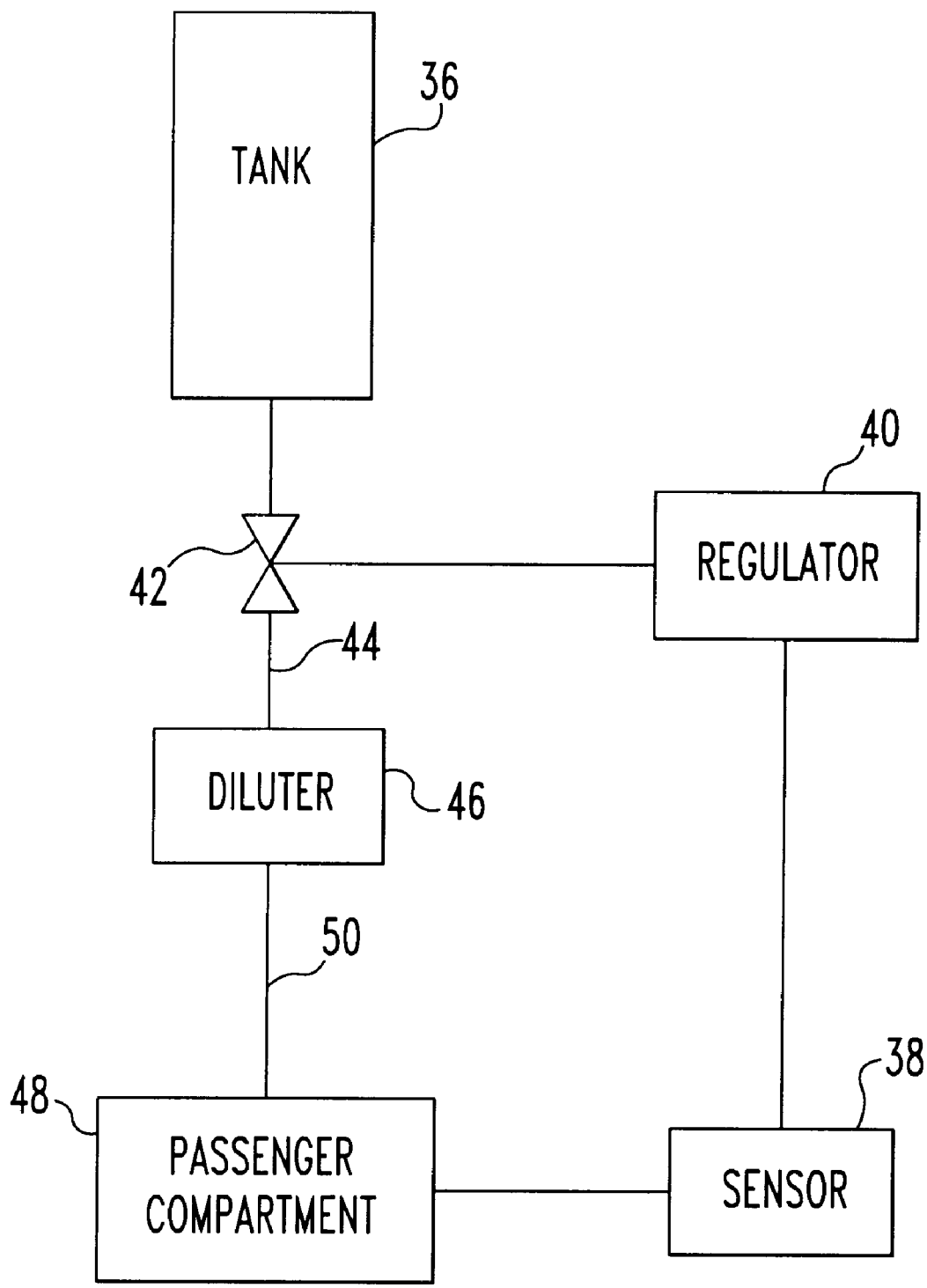
FIG. 3 is a flow diagram of an alternative oxygen supply system for a wheeled vehicle in accordance with this invention.

FIG. 3 shows an alternate embodiment of an oxygen supply system 34 for a wheeled vehicle that uses oxygen from a tank(s) 36. The system 34 includes a sensor 38 for measuring the oxygen content in the passenger compartment, a regulator 40 for opening and closing a valve 42 and feeding oxygen into conduit 44, and a diluter 46 for diluting the oxygen before it is fed through conduit 50 into the passenger compartment 48. The tank or tanks 36 may be carried in the trunk of a passenger vehicle or a storage compartment in other wheeled vehicles. The system 34 works much like the system 20 of FIGS. 1 and 2 to enrich the oxygen content of the air in a passenger compartment to a safe level that helps keep drivers and passengers more alert and less likely to fall asleep and cause accidents.

Figure 4:
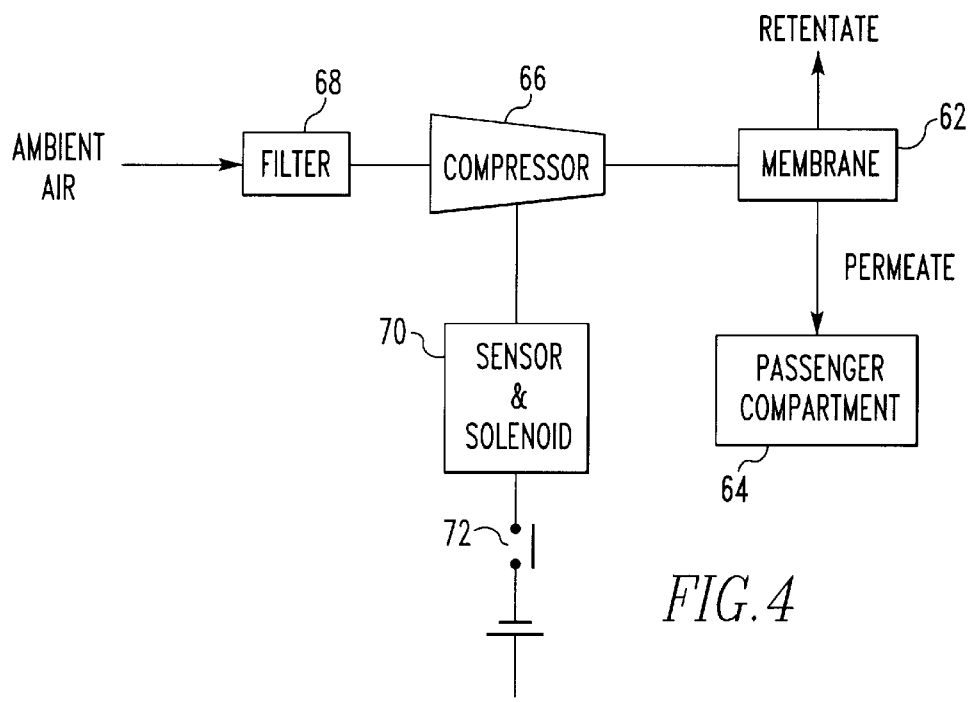
FIGS. 4 and 5 are flow diagrams of additional alternative embodiments of this invention for supplying oxygen-enriched air into the passenger compartments of wheeled vehicles.

FIG. 4 depicts an alternative embodiment of an oxygen-enrichment system 60 for the practice of this invention. The system 60 includes an oxygen-enrichment membrane 62 to separate an oxygen-enriched portion of ambient air, which is fed into a passenger compartment 64. Membranes for separating an oxygen-enriched component of gas are well known in the art. U.S. Pat. No. 5,709,732 discloses a variety of such membranes. As disclosed in that patent, single and multiple stage membranes are known for producing oxygen-enriched gas. The membranes typically comprise hollow fiber membranes in bundles/modules. Ambient air is compressed and flows along the fiber bundle. A membrane can be selected that is more permeable to oxygen than to nitrogen, so an oxygen-enriched permeate gas and a nitrogen-enriched retentate gas are produced. A single stage system will produce modest increase in the permeate of up to about 30° $O_2$ depending on the fibers. Additional stages may be used to produce more highly purified oxygen. The disclosure of that patent and the references cited in the patent are incorporated herein by reference.

The system 60 of FIG. 4 preferably includes a compressor 66 for compressing ambient air that is fed into the membrane 62 to separate an oxygen-enriched permeate gas and from a nitrogen-enriched retentate that is preferably exhausted to the atmosphere. The permeate may desirably have an oxygen content of about 25–45%. As used herein "membrane" means a bundle or module of hollow fibers that are more permeable to oxygen than to nitrogen. The system 60 also preferably includes a filter 68 for filtering out dust and other solid impurities that could adversely affect the membrane 62. The filter 68 may be of a variety of well known designs such as a typical air filter for an internal combustion engine.

The system 10 may include a diluter such as that disclosed with reference to FIG. 3. However, a diluter is not required if a membrane system is selected that produces oxygen-enriched permeate gas that is low enough in oxygen content that it can be fed into the passenger compartment 64 without undue risk of undesirable combustion in the compartment. Oxygen-enriched permeate having an oxygen concentration of 25–30% may provide the desired enrichment of the air in compartment 64, provided the volume flow is at a reasonable level, without undue risk of accidental combustion.

The system 60 may optionally include a sensor 70 for measuring the oxygen content of the air in the passenger compartment 64 as is described above with reference to FIGS. 1 and 2 and an associated electrical solenoid switch responsive to the sensor for switching the compressor 66 on and off, depending on the oxygen concentration in the passenger compartment. The system 60 may also have an on-off switch 72 for manually switching the system on and off. Switch 72 may be located in the passenger compartment or under the hood of the car.

One advantage of a membrane type system is that it may obviate any need to continuously measure the oxygen content of the air in the passenger compartment to regulate the system. Instead, a system can be provided that produces oxygen-enriched air containing approximately 25–35% oxygen in sufficient quantities that the system will raise the oxygen concentration in the passenger compartment 64 to the desired concentration within a relatively few minutes. A typical passenger compartment may have an air space of about 200 to 600 cubic feet. A membrane type oxygen-enrichment system that has a capacity of producing approximately 100 to 300 or more cubic feet per minute (cfm) of oxygen-enriched air would reasonably quickly increase the oxygen content of the air in the passenger compartment to a desired concentration. The air flow capacity and oxygen-enrichment capacity of a system could be matched with the size of a passenger compartment to operate the system continuously without risk of reaching excessive oxygen concentration in the air in the passenger compartment.

It is believed that an oxygen-enrichment system which may be suitable for use in this invention has been developed by Compact Membrane Systems, Inc. in Wilmington, Del., and Argonne National Laboratories using DuPont Teflon® AF fiber as an oxygen exchange mechanism. That system is designed for use in feeding oxygen-enriched air to internal combustion engines to increase the engines' power output. The size of the system depends on the size of the engine to which the oxygen-enriched air is fed. In accordance with the present invention, the Compact Membrane Systems/Argonne membrane unit may be used to provide the oxygen-enriched air for passenger compartments for wheeled vehicles. The desired size of the system depends on the size of the passenger compartment into which the oxygen-enriched air will be fed.

Figure 5:
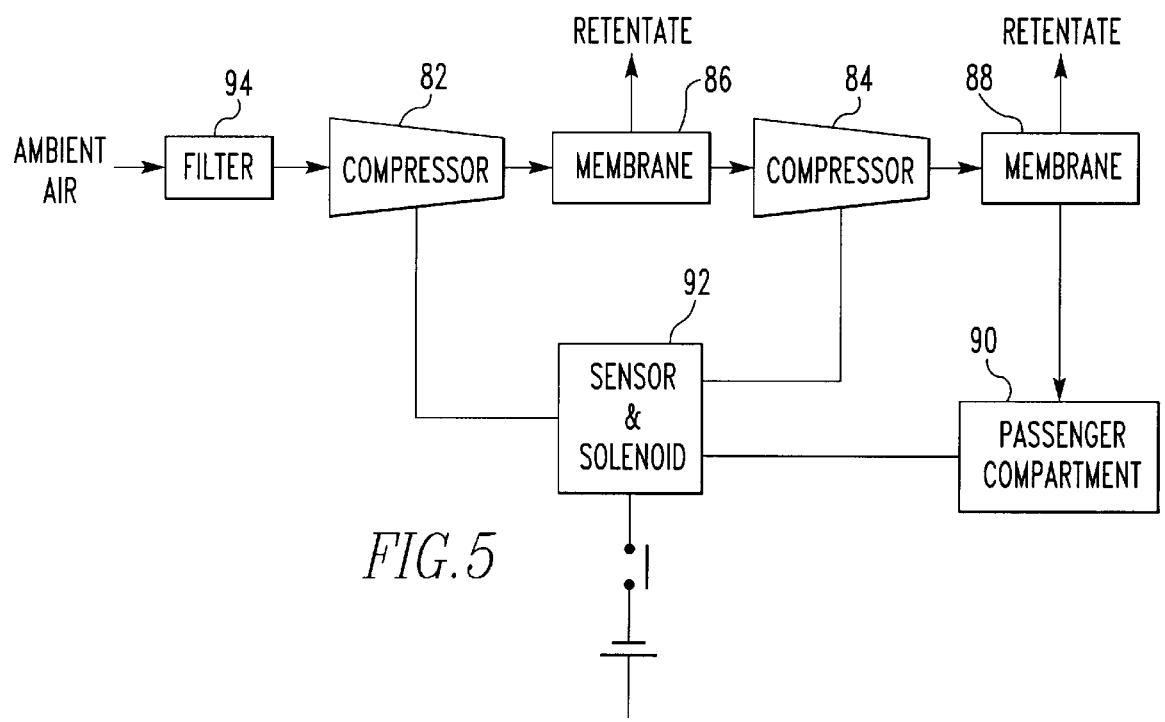

FIG. 5 shows another alternative embodiment of a two-stage oxygen-enrichment system 80 for use in this invention. System 80 includes two compressors 82, 84 and two air separation membranes 86, 88 for enriching the oxygen content of the air that is fed into passenger compartment 90. The system 80 optionally includes an oxygen measuring sensor and solenoid 92 for measuring the concentration of oxygen in the passenger compartment 90 and switching one or both of the compressors on and off to regulate the concentration of the oxygen in the passenger compartment. The system may also include a filter 94 for filtering out air-borne impurities from the ambient air that is pulled into the compressor 82.

It is therefore seen that this invention provides a system for supplying a beneficial quantity of oxygen-enriched air to the passenger/driver compartment of a wheeled vehicle in a safe and efficient manner. The system can potentially prevent many accidents caused by sleepy drivers and also improve the well-being of the driver and passengers in vehicles.

Several preferred embodiments of this invention has been selected for purposes of illustration and explanation. It will be apparent to those skilled in the art that numerous modifications can be made to such preferred embodiments without departing from the invention or the scope of the claims appended hereto. For example, a variety of other oxygen generating systems or chemical reactions might be used to generate oxygen for use in the invention. A variety of control systems can also be used to regulate the oxygen content or flow rate of the enriched air that is fed into the passenger compartment of a vehicle. Such control system could, for example, vary the electrical power that is provided to the electrolyzing unit 22 of FIG. 1 or to the compressors in FIGS. 4 and 5. Dampers could also be used to regulate the flow of oxygen-enriched air into the passenger compartments in the several embodiments selected for illustration. This invention could also be used in boats, ships, office buildings, homes or businesses in which it is desirable to enhance the alertness and general well-being of people in them.

What is claimed is:

1. In a wheeled vehicle having a passenger compartment, the improvement comprising a system for supplying oxygen-enriched air to said passenger compartment for helping drivers and passengers remain alert and maintain well-being including drowsiness reduction, said system comprising:

means for producing oxygen-enriched air;

a conduit for flowing said oxygen-enriched air into said passenger compartment;

an oxygen concentration detection device for detecting the oxygen content of air in said passenger compartment; and means for limiting the oxygen concentration of the air in said passenger compartment so as to not exceed a safe level.

2. A wheeled vehicle as set forth in claim 1, which comprises a passenger car.

3. A wheeled vehicle as set forth in claim 1, which comprises a truck.

4. A wheeled vehicle as set forth in claim 1, which comprises a bus.

5. A wheeled vehicle as set forth in claim 1 in which said means for limiting the oxygen content of the air in said passenger compartment comprises a regulator for regulating the flow of oxygen-enriched air into said passenger compartment to commence the flow when the oxygen content in said passenger compartment falls below a first preselected level and to stop the flow when the oxygen content in said compartment rises to a second preselected level.

6. A wheeled vehicle as set forth in claim 5 which includes a sensor for measuring the oxygen content of said oxygen-enriched air and a regulator for maintaining said oxygen content of the oxygen-enriched air at a third preselected level.

7. A wheeled vehicle as set forth in claim 5 in which said second preselected level is about 24–25% by volume.

8. A wheeled vehicle as set forth in claim 1 in which said system for producing oxygen-enriched air includes at least one gas separation membrane.

9. A wheeled vehicle as set forth in claim 1 in which said system for producing oxygen-enriched air comprises at least two gas separation membranes.

10. A system for supplying oxygen enriched air to a passenger compartment in a wheeled vehicle for helping drivers and passengers remain alert and maintain well-being including drowsiness reduction, comprising:

at least one gas separation membrane for producing oxygen-enriched air;

a compressor for supplying compressed ambient air to said at least one membrane;

a conduit for flowing said oxygen-enriched air from said membrane into said passenger compartment;

an oxygen concentration measuring device for measuring the oxygen content of air in said passenger compartment; and means for limiting the oxygen content of the air in said compartment so as to not exceed a preselected safe concentration.

11. A system as set forth in claim 10 in which said means for limiting the oxygen content of the air in said passenger compartment comprises a regulator for regulating the oxygen content of said oxygen-enriched air that is fed into said passenger compartment.

12. A system as set forth in claim 10 that includes at least two gas separation membranes in series for producing oxygen enriched air from ambient air.

13. A system as set forth in claim 10 which includes a compressor for compressing ambient air to be fed into said gas separation membrane to produce said oxygen-enriched air.

14. A system for supplying oxygen-enriched air to a passenger compartment in a wheeled vehicle for helping drivers and passengers remain alert and maintain well-being including drowsiness reduction, comprising:

means for producing oxygen-enriched air having an oxygen content not exceeding a reasonably safe concentration; and means for flowing said oxygen-enriched air into a passenger compartment of a wheeled vehicle at a flow rate sufficient to raise the oxygen concentration of the air in said compartment to about 24–25% in less than about 10–20 minutes.

15. A system as set forth in claim 14 that includes a hollow fiber membrane unit having fibers that are more permeable to oxygen gas than to nitrogen gas.

* * * * *